(No Model.) 2 Sheets—Sheet 1.

W. MAYBURY.
APPARATUS FOR DYEING, BLEACHING, AND WASHING YARN.

No. 439,966. Patented Nov. 4, 1890.

WITNESSES:
M. Lamson
E. F. McCarty

INVENTOR:
William Maybury
PER C. A. Shaw &co,
ATT'YS.

(No Model.) 2 Sheets—Sheet 2.

W. MAYBURY.
APPARATUS FOR DYEING, BLEACHING, AND WASHING YARN.

No. 439,966. Patented Nov. 4, 1890.

Fig. 2.

WITNESSES:
M. Lamson
E. F. McCarty

INVENTOR:
William Maybury
PER C. A. Shawlee
ATT'YS.

UNITED STATES PATENT OFFICE.

WILLIAM MAYBURY, OF PASADENA, CALIFORNIA.

APPARATUS FOR DYEING, BLEACHING, AND WASHING YARN.

SPECIFICATION forming part of Letters Patent No. 439,966, dated November 4, 1890.

Application filed August 3, 1889. Serial No. 319,646. (No model.)

*To all whom it may concern:*

Be it known that I, WILLIAM MAYBURY, of Pasadena, in the county of Los Angeles, State of California, have invented a certain new and useful Improvement in Apparatus for Dyeing, Bleaching, and Washing Yarn, &c., of which the following is a description sufficiently full, clear, and exact to enable any person skilled in the art or science to which said invention appertains to make and use the same, reference being had to the accompanying drawings, forming part of this specification, in which—

Figure 1:
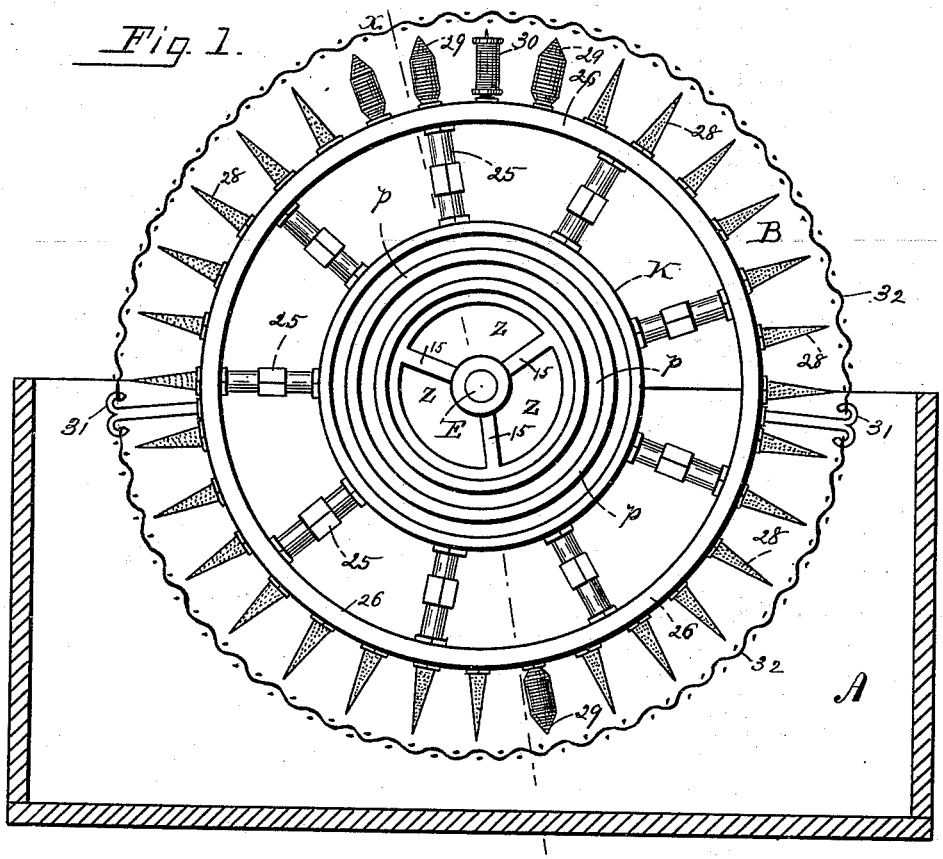

Figure 1 is a sectional elevation of my improved machine; Fig. 2, a vertical transverse section taken on line $x$ $x$ in Fig. 1, and Fig. 3 a view illustrating a modification of the improvement.

Like letters and figures of reference indicate corresponding parts in the different figures of the drawings.

My invention relates to apparatus for bleaching, scouring, steaming, or dyeing cotton or woolen yarn, silk, or other animal or vegetable fiber while on the cop or bobbin, being designed as an improvement on the invention shown in Letters Patent of the United States numbered 266,494, dated October 24, 1882, and granted to me for improvements in similar apparatus; and it consists in certain novel features hereinafter fully set forth and claimed, the object being to produce a more effective and otherwise desirable device of this character than is now in ordinary use.

The nature and operation of the improvement will be readily understood by all conversant with such matters from the following explanation.

In the drawings, A represents the tank for containing the bleaching or dyeing liquid, and B the frame upon which the bobbins or cops are disposed. A box $b$ is secured centrally to the upper edge of each side of the tank, and in each of said boxes is fixed the hub $d$ of the disks C D, respectively. A horizontally-arranged shaft E passes centrally through the hubs and bodies of said disks, said shaft being fitted to rotate therein. A wear-plate or gland $f$ is secured to the outer end of each box $d$ around the shaft. A pipe F opens through the disk D, and passes outward through the tank, its outer end being connected with the suction part of any suitable force-pump G. Cone-pulleys H are secured to the shaft E, and a beveled gear $g$ is disposed on the outer end of said shaft. A vertical shaft $h$ is fitted to revolve in bearings on a bracket $i$, secured to the side of the tank A. The upper end of said shaft bears a beveled gear $j$, which intermeshes with the corresponding gear $g$ on the shaft E. The lower end of the shaft $h$ is connected with the spindle of a steam-valve J, for admitting of shutting off steam from the pump G at any determined point, said valve having an induction-port J', connected with a steam-generator or source of supply, a supply-pipe $J^2$ connecting the eduction-port of said valve with the steam-chest of the steam-pump. The valve J may be supported by the pipe $J^2$ or by other suitable means. The shaft $h$ serves to rotate the valve proper of the valve J, whereby steam is intermittently supplied to the pump at regular intervals. The inner faces of the disks C D are provided with annular tongues and grooves $k$.

Two wheels K L are keyed by their hubs $l$ to the shaft E, the outer faces of their webs $m$ being tongued and grooved at $p$ to respectively work in the tongues and grooves of the disks C D. These wheels are provided with broad rims $q$, one side of which extends laterally over the periphery of the disks C D.

Studs $r$ are secured to the inner faces of the tank A, and rolls $t$ are journaled thereon, the rims of the wheels K L bearing thereon. As many rolls $t$ may be employed as desired, their purpose being to assist in supporting the large wheels and lessen the wear on the tongues and grooves.

A pipe M leads from the discharge part of the pump G, and opens at $v$ through the disk C above the shaft E.

A plate $w$ is bolted to the inner face of each of the wheels K and L, and the interior space between the inner and outer faces is divided by the radial webs 15 into three chambers $y$, as indicated in Fig. 1. The outer disk of each wheel is provided opposite each chamber with a port Z, which in the case of the wheel K establishes communication between the chambers $y$ when on the upper side of the shaft and the recess $v'$ in the disk C, and thence with the pipe M, and in the case of the wheel L establishes communication between the chambers $y$ as they pass the under side of the shaft and the recess $v^2$ in the disk D, and thence with the pipe F. The radial webs 15 serve to cut off communication in the case of the wheels K and L between the chambers which are over the shaft and those which are under the shaft during the rotations of said wheel.

Radial hollow arms 25 are secured to the rim of the hollow wheels K L and open therethrough into the wheel-chambers $y$. Pipes 26, concentric with said wheels, connect the upper ends of each set of arms. Hollow cross pipes or conduits 27 connect the pipes 26, and are screw-tapped at intervals on their outer faces. Perforated hollow spindles 28 are screwed into these conduits, said spindles being cone-shaped to receive cops, as 29, or blunt to receive bobbins, as 30. Hooks 31 are disposed on the pipes 26, and strips of wire-cloth 32 are detachably secured thereto for surrounding the cops or bobbins and holding them on the spindles.

In the use of my improvement the shaft E being rotated, the wheels K L rotate the frame B and continuously immerse the yarn on the cops or bobbins in the liquor in said tank. The pump being in motion, the liquor is drawn by means of its induction-pipe F through the immersed yarns, perforated spindle 28, conduits 27, arms 25, and the wheel-chamber $y$ of the disk D, and is then ejected by said pump through the eduction-pipe M into the chamber $y$ of the opposite wheel K above the shaft E, and is forced outward through the frame and yarn which is out of the liquor in the tank during the rotation of the frame. A constant circulation of the liquor is thus produced and forced through the yarn both from the outside and inside, thoroughly and rapidly effecting the purpose for which it is designed.

A double set of induction and eduction pipes for forcing the bleaching or dyeing liquor through the spindles may be employed, thus enabling the pump to both inject and eject the liquor at a single stroke and insure a more equal distribution of the coloring or bleaching material.

By means of a partial gear on the main driving or other shaft from which the power is taken meshing with a gear on a counter-shaft having pulleys corresponding with the cone-pulleys H on the shaft E, I am enabled to turn the frame B any portion of a rotation desired.

Figure 3:
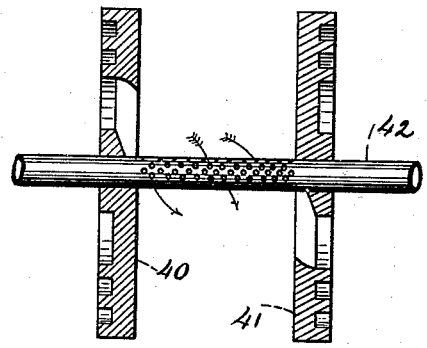

When yarn is to be dyed, bleached, &c., on the beam, instead of the wheels K L, I employ two heads 40 and 41, Fig. 3, fitted by tongues and grooves to work in the disks C D, and connected by a hollow perforated cylinder 42. These heads have three compartments, as in the wheels described, so that when one is immersed in the liquor it will be drawn therethrough into the pump and forced through the opposite head into the cylinder, and thence through the yarn thereon into the tank again.

The beam described is metallic, and to prevent it from rusting or being affected by acids in the liquor I enamel it.

Having thus explained my invention, what I claim is—

1. The combination of a tank, a hollow frame mounted by two hollow wheels to rotate in said tank, a force-pump having its induction-pipe opening into the lower portion of one wheel and its eduction-pipe into the upper portion of the opposite wheel, substantially as described.

2. The combination of a tank, grooved disks secured to opposite sides thereof, a driving-shaft mounted in said disks, chambered wheels on said shaft fitted to work in the grooves of said disks, a hollow frame bearing perforated spindles and mounted on said wheels, and pipes for supplying coloring or other liquid thereto, substantially as described.

3. The combination of a tank, a driving-shaft mounted in disks on said tank, hollow wheels keyed to said shaft and having their webs tongued and grooved to rotate in said disks, a hollow frame mounted on and opening into said wheels, perforated spindles on said frame, and a pump having its induction-pipe opening into one wheel and its eduction-pipe into the opposite wheel, substantially as described.

4. The frame B, provided with spindles 29, the wheels K L, disks C D, shaft E, and tank A, arranged to operate substantially as described.

5. The tank A, frame B, wheels K L, disks C D, shaft E, and pump G, having pipes F M, combined and arranged substantially as described.

6. The tank A and shaft E, having the beveled gear $g$, in combination with the vertical shaft $h$, having gear $j$, the valve J, and pump G, arranged substantially as described.

7. The disks C D, mounted in rectangular boxes $b$, the shaft E, journaled in said disks, in combination with tank A, gland $f$, and wheels K L, bearing the frame B, substantially as described.

8. The hollow wheels K L, mounted on a shaft and bearing the frame B, having hollow spindles 29, in combination with the tank A, and pipes for drawing liquor from said tank through said frame into one wheel and forcing it through the opposite wheel into said frame and tank, substantially as described.

9. The wheels K L, bearing the frame B, in combination with the disks C D, shaft E, and tank A, provided with the supporting-rolls $t$ for said wheels, substantially as described.

10. The combination of a tank, disks mounted in rectangular boxes on said tank, a shaft rotating on said disks, hollow wheels mounted on said shaft, said wheels being tongued and grooved to rotate in similar grooves on said disks, a hollow frame mounted on said wheels and provided with perforated spindles, a pump, a pipe leading therefrom into the lower portion of one wheel, and a pipe connecting said pump with the upper portion of the opposite wheel, substantially as and for the purpose set forth.

11. The wheels K L, provided with chambers $y$, and tongued and grooved at $p$, in combination with the grooved disks C D, shaft E, and tank A, substantially as described.

WILLIAM MAYBURY.

Witnesses:
JOHN F. ASHWORTH,
DAVID K. CASHIN.